(12) United States Patent
Frehn et al.

(10) Patent No.: US 9,475,107 B2
(45) Date of Patent: Oct. 25, 2016

(54) METHOD FOR PRODUCING A MOTOR VEHICLE AXLE COMPONENT

(71) Applicant: Benteler Automobiltechnik GmbH, Paderborn (DE)

(72) Inventors: Andreas Frehn, Delbrück (DE); Ralf Ilskens, Paderborn (DE); Dominik Howekenmeier, Verl (DE); Jeffrey M. Hatt, Livonia, MI (US)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 389 days.

(21) Appl. No.: 14/172,427

(22) Filed: Feb. 4, 2014

(65) Prior Publication Data
US 2014/0216124 A1 Aug. 7, 2014

(30) Foreign Application Priority Data

Feb. 5, 2013 (DE) .......................... 10 2013 101 130

(51) Int. Cl.
| C21D 9/00 | (2006.01) |
| B21B 1/08 | (2006.01) |
| C21D 1/18 | (2006.01) |
| C21D 1/20 | (2006.01) |
| C21D 1/673 | (2006.01) |

(52) U.S. Cl.
CPC . *B21B 1/08* (2013.01); *C21D 1/18* (2013.01); *C21D 1/20* (2013.01); *C21D 1/673* (2013.01); *C21D 9/0068* (2013.01); *B60G 2206/121* (2013.01); *B60G 2206/20* (2013.01); *B60G 2206/722* (2013.01); *B60G 2206/8109* (2013.01); *B60G 2206/81035* (2013.01); *B60G 2206/8201* (2013.01); *C21D 9/00* (2013.01); *C21D 2261/00* (2013.01)

(58) Field of Classification Search
None
See application file for complete search history.

(56) References Cited

U.S. PATENT DOCUMENTS

| 2001/0004910 A1 | 6/2001 | Yasuhara et al. | |
| 2010/0187291 A1* | 7/2010 | Kriegner | B21D 22/02 228/173.6 |
| 2011/0182765 A1 | 7/2011 | Giefers et al. | |
| 2013/0174948 A1* | 7/2013 | Peultier | C21D 6/004 148/609 |
| 2015/0259771 A1* | 9/2015 | Vartanov | C22C 38/50 148/318 |

FOREIGN PATENT DOCUMENTS

| DE | 699 20 847 | 2/2005 |
| DE | 102008060161 | 6/2010 |
| GB | 2 449 215 | 11/2008 |
| WO | WO 02/103070 | 12/2002 |

* cited by examiner

*Primary Examiner* — George Wyszomierski
(74) *Attorney, Agent, or Firm* — Henry M. Feiereisen LLC

(57) ABSTRACT

A method for producing a motor vehicle axle component includes the method steps of providing a metal strip made of a hardenable steel material, hot rolling the metal strip and subsequent cold rolling with more than 4% rolling reduction degree, annealing at 600 to 800° C., in particular at 650 to 750° C. for a time period between 10 and 20 hours, in particular 13 to 17 hours, cutting the heat treated metal strip to cut sheet metals, forming the metal cut into a motor vehicle axle component, austenizing and quenching the motor vehicle axle component, wherein the motor vehicle axle component has at least in a surface region a grain size characteristic value according to ASTM-E 112 of greater than 9.

14 Claims, 2 Drawing Sheets

METHOD FOR PRODUCING A MOTOR VEHICLE AXLE COMPONENT

CROSS-REFERENCES TO RELATED APPLICATIONS

This application claims the priority of German Patent Application, Serial No. 10 2013 101 130.6, filed Feb. 5, 2013, pursuant to 35 U.S.C. 119(a)-(d), the disclosure of which is incorporated herein by reference.

BACKGROUND OF THE INVENTION

The present invention relates to a method for producing a motor vehicle axle component.

The following discussion of related art is provided to assist the reader in understanding the advantages of the invention, and is not to be construed as an admission that this related art is prior art to this invention.

From the state-of-the-art it is known to produce motor vehicle axle components in particular from steel materials.

For this it is known from the state-of-the-art for example to first roll a steel strip and thereafter to form a motor vehicle axle component from the steel strip. For this purpose, the steel strip is cut to size and then formed into a control arm in the form of a control-arm shell for example by press forming or a deep drawing process. For this, it is also known in the state-of-the-art to directly form the steel strip into a tubular body or to first cut the steel strip to size and to then form a tubular body from the cut to size steel blank. The tubular body is welded, in particular longitudinal seam welded, and subjected to a further shaping so as to produce for example a torsional profile as transverse beam of a twist-beam axle. In this way it is also possible to produce motor vehicle stabilizers.

In this way, in particular closed torsion profiles of a twist-beam axle are produced, wherein first a tube is produced by a continuous welding process of a hot rolled steel strip, and subsequently normalizing is carried out at about 900° C. The thus produced tube is then brought into the desired shape in a further cold forming process for further processing into the twist-beam axle. Subsequent thereto an austenizing is performed, wherein the thus produced torsion profile is firstly heated to about 900° C. and subsequently hardened by fast cooling so that the austenite is transformed into martensite. After the hardening process a tempering at temperatures of about 200° C. to 500° C. can be performed depending on the desired properties. This results in a component with predominantly tempered martensite which depending on the annealing atmosphere may have a surface decarburization.

The thus produced component has a high hardness while possessing acceptable ductility. However, because a motor vehicle axle component, in particular a vehicle body part, is subjected to increased continuous alternating stress and bending stress during its use, material fatigue may occur and in particular cracks may form in the edge region. The motor vehicle axle component, in particular the motor vehicle axle, may then be damaged and would have to be exchanged after technical checking.

It is known from the state of the art to use higher quality materials with complex processing methods, in particular heat post treatment methods, which however at the same time is associated with higher production costs. In the vehicle classes in which in particular a twist-beam axle is used, the increase in production costs is often not economical.

It would therefore be desirable and advantageous to provide an improved method with which it is possible to produce vehicle axle components in a cost effective manner, which have the demanded strength properties and a significantly increased service life.

SUMMARY OF THE INVENTION

According to one aspect of the present invention, for producing a motor vehicle axle component, in particular a twist-beam axle, includes the steps of
   providing a metal strip made of hardenable steel
   hot rolling the metal strip and subsequent cold rolling with more than 4% rolling reduction,
   annealing at 600° C. to 800° C., in particular at 650° C. to 750° C. for a time period of between 10 and 20 hours, in particular 13 to 17 hours,
   cutting the heat treated metal strip to cut to steel blanks,
   forming the steel blank into a motor vehicle axle component,
   austenizing and quenching the motor vehicle axle component, wherein the motor vehicle axle component at least in a surface region has a grain characteristic value according to ASTM-E 112 of greater than 9.

According to the invention the metal strip made of hardenable steel is not subsequently hot rolled but is cold rolled again after the hot rolling. The cold rolling should hereby have a rolling reduction degree of more than 4%. Currently preferred is a rolling reduction degree between 4% and 50%, in particular between 4% and 40% and particularly preferably between 4% and 20%.

Within the context of the invention, hot rolling means a rolling in which the component to be rolled has a temperature above re-crystallization temperature, and cold rolling means a rolling in which the component has a temperature below the re-crystallization temperature. The re-crystallization temperature in the case of steel alloys used according to the invention is between 500° C. and 650° C.

Subsequent to the cold rolling, which follows the hot rolling, the material thus produced by rolling is heat treated by annealing at a temperature between 600° C. and 800° C. between 10 hours and 20 hours, preferably between 650° C. and 750° C. for a time period of 13 hours to 17 hours, and particularly preferably about at 700° C. for a time period of 15 hours. This results in softening of the strain hardenings, which were generated during the cold rolling, and a significantly finer material microstructure is established.

After the heat treatment the metal strip is cut to produce steel blanks. Within the scope of the invention it is also possible that the metal strip is cut after the cold rolling and prior to the heat treatment by annealing. The steel blanks are then formed into the motor vehicle axle component. Depending on the mechanical demands on the component it is possible to perform a tempering process after the forming process. This tempering is in particular carried out by way of austenizing and subsequent quench hardening of the produced component. For this, the component is in particular heated to a temperature of about 900° C., in particular above 900° C. The component has a grain characteristic value according to ASTM-E 112 in a surface region greater than 9. The surface region is an edge region, which extends from the surface into the material up to a depth of 0.5 mm. The grain characteristic value of the material itself is determined with the formula for determining the ASTM grain characteristic value G in metals. The grain characteristic value G according to ASTM is also referred to as ASTM grain characteristic value, wherein for this a calculation formula is disclosed in DIN EN ISO 643:2003 (D) and therein in appendix C under sub-heading C.3, and in the ASTM E-112. The ASTM grain characteristic value can hereby be determined according to the method with straight cut segment or according to the counting method.

An alternative thereto is to determine the number of the grains per mm$^2$, wherein in this case more than 4000 grains should be distributed per mm$^2$ and the microstructure should be adjusted so that more than 4000 grains per mm$^2$ are present in the surface region. A minimal lower threshold value would be at least 3000 grains per mm$^2$.

According to another advantageous feature of the invention, a mixed microstructure of martensite, bainite and ferrite is generated in particular in the surface region by the austenization and subsequent quench hardening, which compared to the production method known from the state of the art which predominantly has tempered martensite, has a slightly reduced hardness but a significantly increased service life.

As a result of the upstream cold rolling process, faults in the material structure, in particular in the region of the surface, which may for example occur as a result of the hot rolling process, are compensated or avoided.

According to another advantageous feature of the invention, the rolled metal strip, i.e., the metal strip after the hot rolling and the cold rolling, can be processed into a tube, wherein the formed metal strip is produced as longitudinal seam welded tube by a thermal joining process, for example high frequency welding or laser welding. The thus produced semi-finished tube is then subjected to the heat treatment by annealing and can be cut to the corresponding desired tube lengths prior to or subsequent to the heat treatment. As a result of the annealing heat treatment, the tube is normalized and in particular the microstructure in the region of the heat influence zone and the longitudinal welding seam itself is homogenized with the remaining tube. The normalizing occurs in particular at a temperature above the AC1-point, especially preferably at a temperature between 800° C. and 950° C., particularly preferably at a temperature between 800° C. and 950° C., particularly preferably between 800° C. and 910° C. Subsequent thereto the normalized tube is cold formed into a transverse profile of a twist-beam axle and subsequent to the cold forming again austenized and quenched. According to the invention a mixed microstructure of martensite, bainite and ferrite is generated in the surface region by the austenizing and subsequent quench hardening, which has a slightly reduced hardness but a significantly increased service life compared to the production method known from the state of the art which predominantly contains tempered martensite.

The method can in particular be used for producing a motor vehicle axle component from a material with the following alloy components in weight %:

|  | min | max |
| --- | --- | --- |
| Carbon (C) | 0.220% | 0.250% |
| Manganese (Mn) | 1.200% | 1.400% |
| Silicone (Si) | 0.200% | 0.300% |
| Phosphorous (P) | 0% | 0.020% |
| Sulfur (S) | 0% | 0.005% |
| Aluminum (Al) | 0.020% | 0,.050% |
| Titanium (Ti) | 0.020% | 0.050% |
| Chromium (Cr) | 0.110% | 0.200% |
| Boron (B) | 0.002% | 0.0035% |
| Molybdenum (Mo) | 0% | 0.100% |

-continued

|  | min | max |
| --- | --- | --- |
| Copper (Cu) | 0% | 0.100% |
| Nickel (Ni) | 0% | 0.100% |

Remainder iron and smelting related impurities

Within the scope of the invention, the forming after the rolling and heat treatment occurs again particularly preferably as cold forming method. Within the scope of the invention it is also possible however that after the annealing process the semi-finished product to be formed, i.e., the steel blank or the produced tube, still has a residual heat resulting from the annealing process.

Within the scope of the invention preferably a center torsion profile of a twist-beam axle is produced from the rolled and heat treated steel material, which subsequent thereto is then coupled with longitudinal suspension arms.

It is further possible within the scope of the invention that after the heat treatment and the forming, the produced motor vehicle axle component, in particular the produced torsion profile, is treated by surface blasting. This increases the roughness and residual compressive stresses are introduced which avoid crack formation in the surface region.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
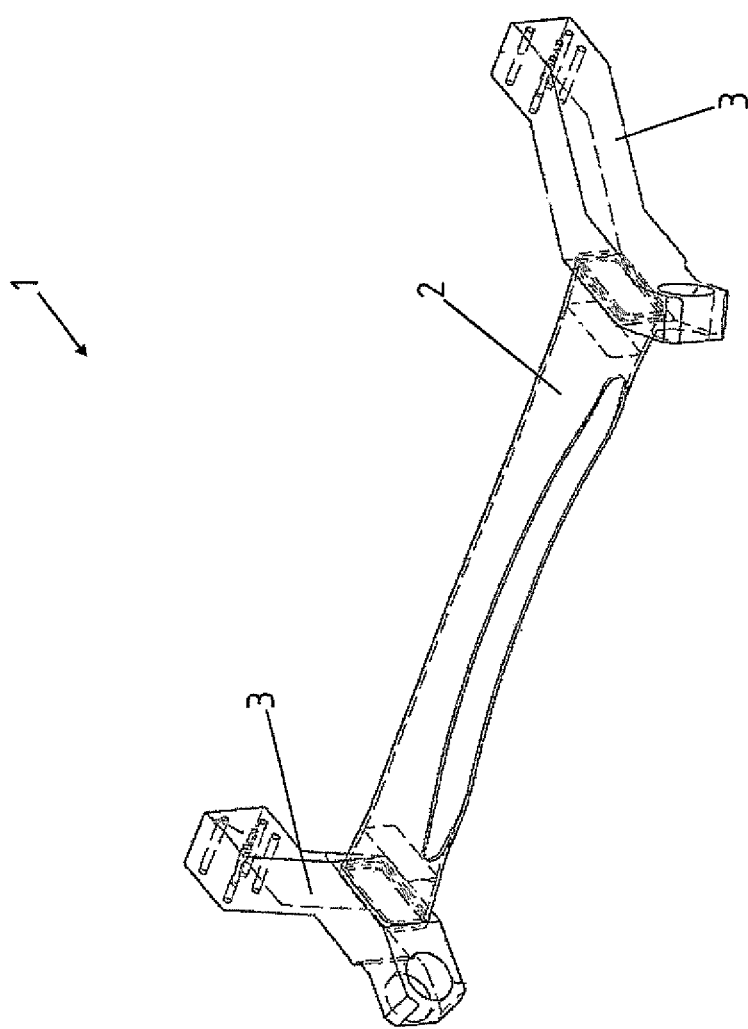
FIG. 1 shows a twist-beam axle produced according to the invention in a perspective view and FIG. 2 shows a transverse control arm produced according to the invention in perspective view.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown perspective view of a motor vehicle axle component in the form of a twist-beam axle 1. The twist-beam axle 1 has a torsion profile 2 arranged in the center, which at its ends 5 is coupled with longitudinal suspension arms 3. The longitudinal suspension arms 3 and/or the torsion tube 2 can be produced with the method according to the invention, whereupon the individual parts are then coupled with each other. As an alternative the twist-beam axle 1 can also be produced one-piece according to the production method according to the invention. In the case of the multi-part production the individual parts can then for example be connected with each other for example by welding or via a positive coupling.

Figure 2:
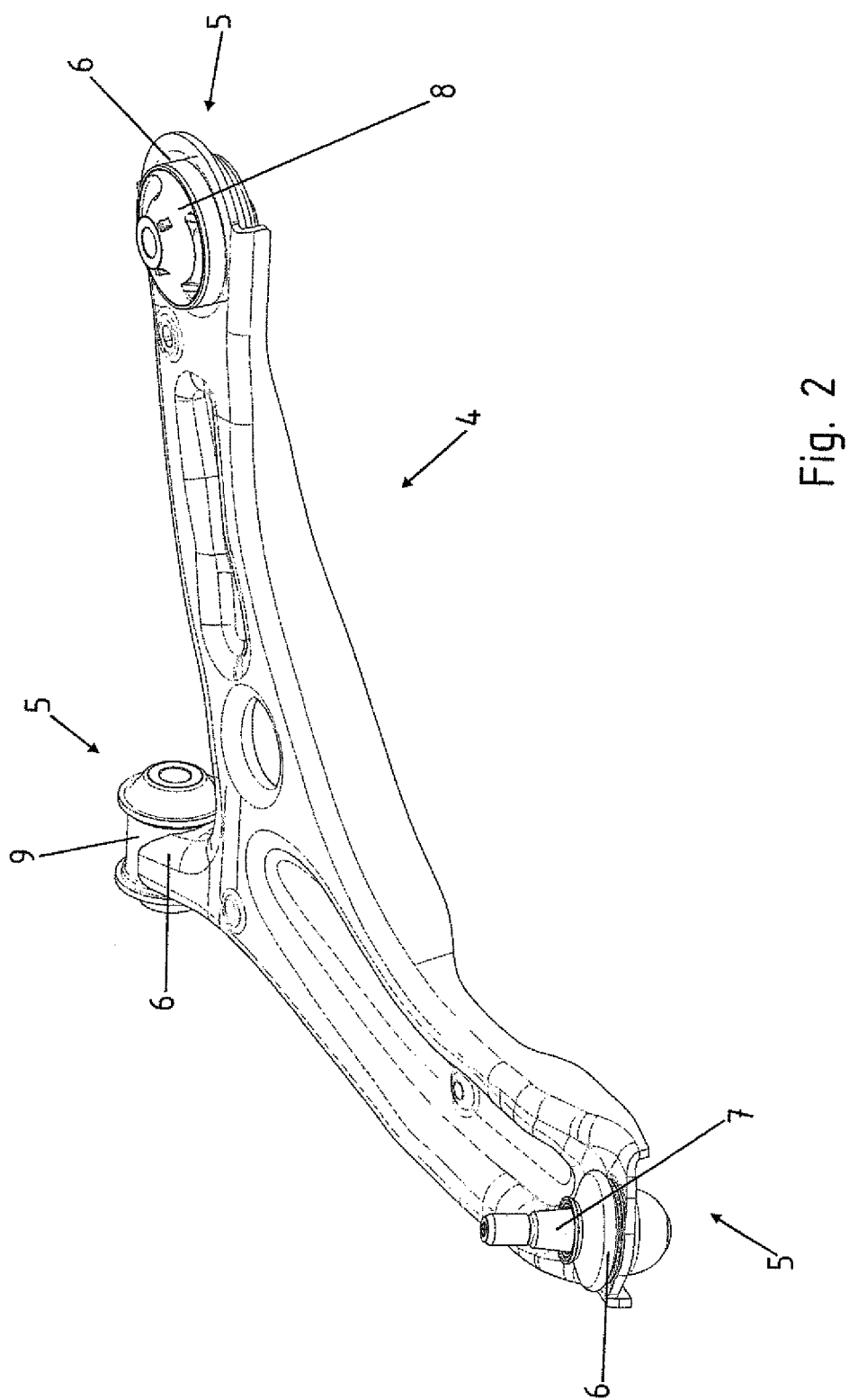

FIG. 2 shows a motor vehicle axle component in the form of a transverse control arm 4. The transverse control arm 4 is in this case configured as single shell component and respectively has at its ends 5 bearing receptacles 6. The bearing receptacles 6 can be produced during the forming itself on the transverse control arm 4 and then receive corresponding pivot bearing 7 for example with ball studs or other rubber metal bearings 8. A connection sleeve 8 can also be coupled for example with the transverse control arm 4.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method for producing a motor vehicle axle component, comprising:
   providing a metal strip made of a hardenable steel material;
   hot rolling the metal strip and subsequent cold rolling with more than 4% rolling reduction degree;
   annealing the metal strip at 600 to 800° C. for a time period between 10 and 20 hours;
   cutting a metal sheet from the heat treated metal strip;
   forming the cut metal sheet into the motor vehicle axle component; and
   austenitizing and quenching the motor vehicle axle component, wherein the motor vehicle axle component has at least in a surface region a grain size characteristic value according to ASTM-E 112 of greater than 9.

2. The method of claim 1, wherein the metal strip is annealed at 650 to 750° C. for a time period between 13 to 17 hours.

3. The method of claim 1, wherein the steel material has the following alloy elements in weight %:

|  | min | max |
|---|---|---|
| Carbon (C) | 0.220% | 0.250% |
| Manganese (Mn) | 1.200% | 1.400% |
| Silicon (Si) | 0.200% | 0.300% |
| Phosphorous (P) | 0% | 0.020% |
| Sulfur (S) | 0% | 0.005% |
| Aluminum (Al) | 0.020% | 0.050% |
| Titanium (Ti) | 0.020% | 0.050% |
| Chromium (Cr) | 0.110% | 0.200% |
| Boron (B) | 0.002% | 0.0035% |
| Molybdenum (Mo) | 0% | 0.100% |
| Copper (Cu) | 0% | 0.100% |
| Nickel (Ni) | 0% | 0.100% |

Remainder iron and smelting related impurities.

4. The method of claim 1, wherein the forming into the motor vehicle axle component is carried out as cold forming process.

5. The method of claim 1, wherein a mixed microstructure of marteniste, bainite and ferrite is established in a surface region of the motor vehicle axle component.

6. The method of claim 1, further comprising after the hot rolling of the metal strip, forming the metal strip into a tube, wherein the tube is optionally longitudinally seam welded by a thermal joining method and is subsequently heat treated by normalizing annealing.

7. The method of claim 6, wherein the normalizing annealing is carried out at 800 to 950° C.

8. The method of claim 7, wherein the normalizing annealing is carried out at 880 to 910° C.

9. The method of claim 1, wherein the motor vehicle axle component is a torsion tube for a torsion beam axle, the method further comprising coupling ends of the torsion tube with longitudinal suspension arms.

10. The method of claim 1, further comprising blasting the produced motor vehicle axle component with a blasting means.

11. The method of claim 10, wherein the motor vehicle axle component is surface blasted.

12. The method of claim 1, wherein the cold rolling is carried out below a re-crystallization temperature of the steel material and the hot rolling is carried out above the re-crystallization temperature.

13. The method of claim 12, wherein the re-crystallization temperature is between 500° C. and 650° C.

14. The method of claim 12, wherein the motor vehicle axle component is a twist-beam axle.

* * * * *